United States Patent
Yasuda et al.

(10) Patent No.: US 9,517,407 B2
(45) Date of Patent: Dec. 13, 2016

(54) GAME SYSTEM AND GAME CONTROLLER

(75) Inventors: Shunpei Yasuda, Kyoto (JP); Naoto Kobe, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 807 days.

(21) Appl. No.: 13/640,837

(22) PCT Filed: May 25, 2012

(86) PCT No.: PCT/JP2012/003447
§ 371 (c)(1),
(2), (4) Date: Oct. 12, 2012

(87) PCT Pub. No.: WO2013/157054
PCT Pub. Date: Oct. 24, 2013

(65) Prior Publication Data
US 2013/0281213 A1    Oct. 24, 2013

(30) Foreign Application Priority Data

Apr. 20, 2012 (JP) ................................ 2012-097099

(51) Int. Cl.
*A63F 13/24* (2014.01)
*A63F 13/42* (2014.01)

(52) U.S. Cl.
CPC .............. *A63F 13/24* (2014.09); *A63F 13/42* (2014.09); *A63F 2300/1025* (2013.01); *A63F 2300/1043* (2013.01); *A63F 2300/6045* (2013.01)

(58) Field of Classification Search
USPC ......................................................... 463/36
See application file for complete search history.

(56) References Cited

U.S. PATENT DOCUMENTS

| | | | | |
|---|---|---|---|---|
| 5,551,701 A | * | 9/1996 | Bouton et al. | ................... 463/36 |
| 6,171,191 B1 | | 1/2001 | Ogata et al. | |
| 6,752,719 B2 | * | 6/2004 | Himoto et al. | ................. 463/37 |
| 6,776,717 B2 | * | 8/2004 | Shinohara et al. | ............. 463/37 |
| 7,081,051 B2 | * | 7/2006 | Himoto et al. | ................. 463/37 |
| 7,407,439 B1 | * | 8/2008 | Ochoa | ............................ 463/37 |
| 7,473,180 B2 | * | 1/2009 | Himoto et al. | ................. 463/37 |
| 7,488,254 B2 | * | 2/2009 | Himoto et al. | ................. 463/37 |
| 7,758,424 B2 | * | 7/2010 | Riggs et al. | .................... 463/37 |

(Continued)

FOREIGN PATENT DOCUMENTS

| | | |
|---|---|---|
| EP | 1 582 241 A1 | 10/2005 |
| EP | 1 852 162 A1 | 11/2007 |

(Continued)

OTHER PUBLICATIONS

International Search Report for PCT/JP2012/003447 issued Aug. 14, 2012, 5 pages.

(Continued)

*Primary Examiner* — Jay Liddle
(74) *Attorney, Agent, or Firm* — Nixon & Vanderhye, P.C.

(57) ABSTRACT

A second game controller includes both of a first detection section provided in a first game controller, and a second detection section provided in an extended controller that is detachably connected to the first game controller. An operation to the second game controller is detectable by the both detection sections, but the result of the detection by the first detection section is not included in transmission data to be transmitted to a game apparatus.

4 Claims, 9 Drawing Sheets

(56) References Cited

U.S. PATENT DOCUMENTS

| | | |
|---|---|---|
| 8,241,126 B2* | 8/2012 | Ambinder et al. ............. 463/38 |
| 2002/0098887 A1 | 7/2002 | Himoto et al. |
| 2002/0103026 A1 | 8/2002 | Himoto et al. |
| 2002/0107071 A1 | 8/2002 | Himoto et al. |
| 2003/0220142 A1* | 11/2003 | Siegel ............................. 463/37 |
| 2004/0048665 A1 | 3/2004 | Ogata et al. |
| 2005/0215322 A1 | 9/2005 | Himoto et al. |
| 2005/0233808 A1 | 10/2005 | Himoto et al. |
| 2005/0255915 A1 | 11/2005 | Riggs et al. |
| 2007/0078002 A1 | 4/2007 | Evans et al. |
| 2008/0153593 A1* | 6/2008 | Ikeda et al. ..................... 463/37 |
| 2009/0042649 A1 | 2/2009 | Hsieh et al. |
| 2010/0007528 A1 | 1/2010 | Urata et al. |
| 2010/0075756 A1* | 3/2010 | Roberts et al. ................. 463/39 |
| 2010/0262718 A1 | 10/2010 | Ikeno et al. |
| 2011/0098116 A1 | 4/2011 | Liu |
| 2011/0105231 A1 | 5/2011 | Ambinder et al. |
| 2011/0172016 A1* | 7/2011 | Ikeda et al. ..................... 463/37 |
| 2011/0190049 A1 | 8/2011 | Mae et al. |
| 2011/0190050 A1 | 8/2011 | Mae et al. |
| 2011/0190052 A1 | 8/2011 | Takeda et al. |
| 2011/0190061 A1 | 8/2011 | Takeda et al. |
| 2011/0285704 A1 | 11/2011 | Takeda et al. |
| 2012/0015732 A1 | 1/2012 | Takeda et al. |
| 2012/0026166 A1 | 2/2012 | Takeda et al. |
| 2012/0040759 A1 | 2/2012 | Ito et al. |
| 2012/0044177 A1 | 2/2012 | Ohta et al. |
| 2012/0046106 A1 | 2/2012 | Ito et al. |
| 2012/0052952 A1 | 3/2012 | Nishida et al. |
| 2012/0052959 A1 | 3/2012 | Nishida et al. |
| 2012/0088580 A1 | 4/2012 | Takeda et al. |
| 2012/0106041 A1 | 5/2012 | Ashida et al. |
| 2012/0106042 A1 | 5/2012 | Ashida et al. |
| 2012/0108329 A1 | 5/2012 | Ashida et al. |
| 2012/0108340 A1 | 5/2012 | Ashida et al. |

FOREIGN PATENT DOCUMENTS

| | | |
|---|---|---|
| JP | 10-295937 | 11/1998 |
| JP | 3756955 | 1/2006 |
| JP | 2007-160006 | 6/2007 |
| JP | 2010-246684 | 11/2010 |
| JP | 2012-064199 | 3/2012 |

OTHER PUBLICATIONS

Written Opinion of the International Searching Authority and partial translation mailed Aug. 14, 2012, 6 pages.

International Search Report for PCT/JP2012/003445 issued Aug. 14, 2012, 3 pages.

International Search Report for PCT/JP2012/003446 issued Aug. 14, 2012, 3 pages.

"Instruction Manual for Classic Controller Pro", Nintendo Co., Ltd., Aug. 1, 2009 and partial translation, 2 pages.

Extended European Search in European Application EP 12 87 4555.1 dated Sep. 4, 2015.

Office Action in corresponding U.S. Appl. No. 13/640,867 dated Mar. 27, 2015.

European Search Report in EP 12 87 4462 dated Apr. 23, 2015.

* cited by examiner

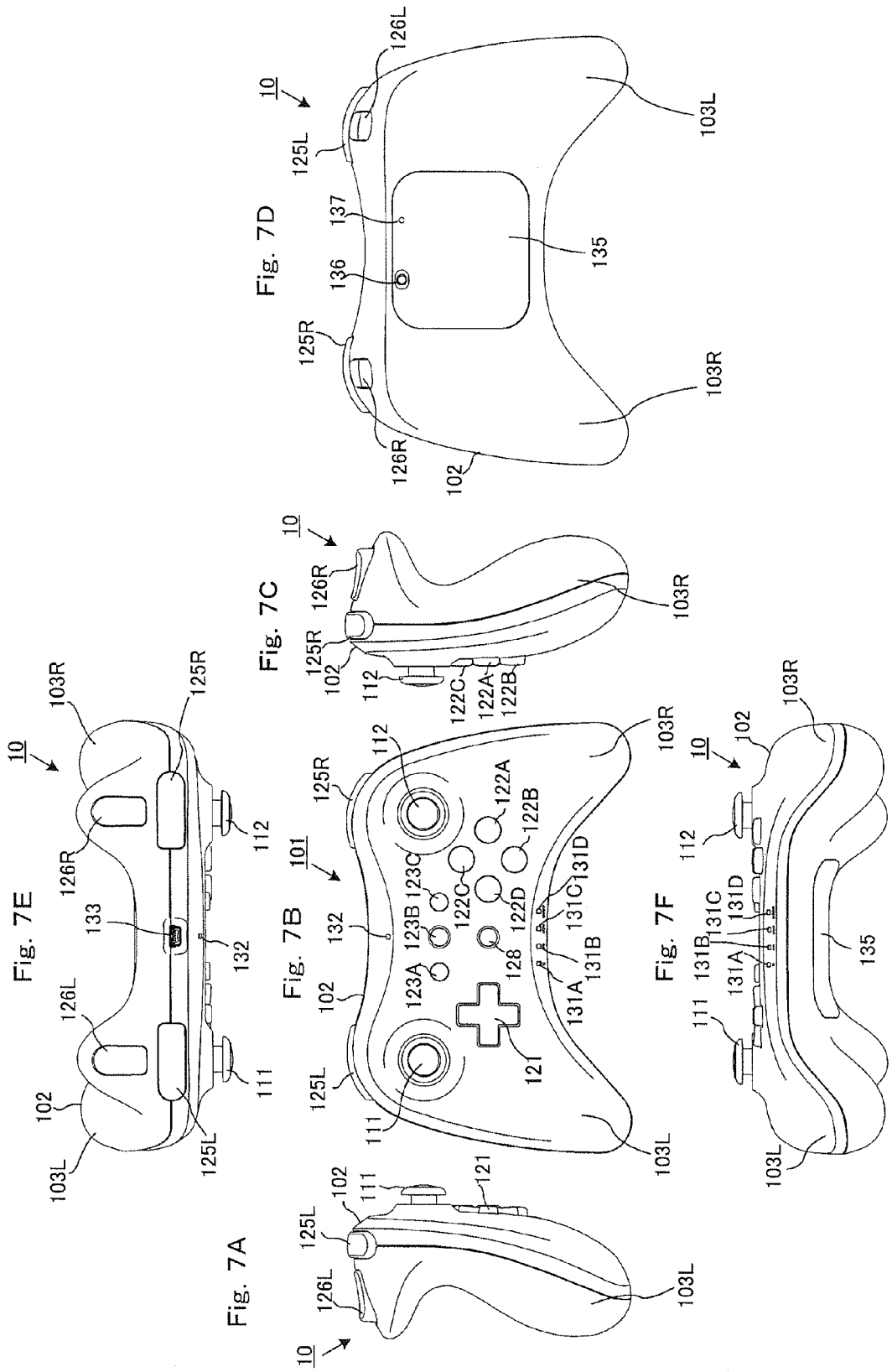

GAME SYSTEM AND GAME CONTROLLER

This application is the U.S. national phase of International Application No. PCT/JP2012/003447 filed 25 May 2012 which designated the U.S. and claims priority to JP 2012-097099 filed 20 Apr. 2012, the entire contents of each of which are hereby incorporated by reference.

TECHNICAL FIELD

The present invention relates to a game system, and more particularly, to a game system including at least a first game apparatus, a first game controller, and a second game controller.

BACKGROUND ART

Conventionally, a game apparatus has been known which includes, as a standard controller, a game controller held and operated with one hand. As an example of an extended controller of the game apparatus, a game controller has been known which is held and operated with both hands, and includes two sticks, a cross key, and a plurality of operation buttons.

CITATION LIST

Non Patent Literature

[NPL 1] "Instruction Manual for Classic Controller Pro", Nintendo Co., Ltd., Aug. 1, 2009

SUMMARY OF THE INVENTION

Problems to be Solved by the Invention

The above-mentioned extended controller having two analog sticks improves operability in a game. However, there is a case where the game controller is difficult to operate under a specific condition. For example, in a case where the two sticks are positioned near the center of the controller (to the front side relative to a cross key and ABXY buttons) and both the sticks are simultaneously tilted inward, since the space between the two sticks is narrow, it is difficult to tilt the sticks. Further, the sticks may impede a player from operating buttons. In particular, when operating a home button, a plus button, or a minus button, a player should press the button with a finger beyond the stick, and therefore, the player cannot press the button quickly. Further, since the two sticks are distant from L and R buttons, it is difficult to simultaneously operate the two sticks and the L and R buttons.

Therefore, an object of the present invention is to provide a two-handed game controller which is easy to operate.

Another object of the present invention is to provide a game system and a game controller which reduce the burden on development of software such as games when the above-mentioned easy-to-operate game controller is used.

Still another object of the present invention is to provide a game system and a game controller which reduce the cost related to manufacturing of the easy-to-operate game controller.

Solution to the Problems

The above object is achieved by the following configuration examples, for example.

A configuration example is a game system including at least a first game apparatus, a first game controller, and a second game controller. The first game controller includes: a first communication section that wirelessly communicates with the game apparatus; a first detection section that is able to generate first transmission data including a result of an input performed on a predetermined operation section; a first operation section that includes a plurality of keys, and is electrically connected to the first detection section; and a connector to which an extended controller is detachably connected, which extended controller includes a second operation section that includes a plurality of keys, and a second detection section that is able to output, to the first detection section, second operation section detection data indicating the content of an input to the second operation section. The first detection section detects at least an input to the first operation section, generates the first transmission data in which first operation section detection data indicating the result of the detection is included, and outputs the first transmission data to the first communication section. The first communication section transmits, to the game apparatus, the first transmission data outputted from the first detection section. On the other hand, the second game controller includes: a second communication section that communicates with the game apparatus by using the same wireless protocol as that used by the first communication section; a third detection section that is able to generate second transmission data including a result of an input performed on a predetermined operation section; a fourth detection section; and a third operation section that includes a plurality of keys, and is electrically connected to the third detection section and the fourth detection section. The third detection section and the fourth detection section are able to detect an input to the third operation section. The fourth detection section outputs, to the third detection section, third operation section detection data detected by the fourth detection section. The third detection section generates the second transmission data in which third operation section detection data detected by the third detection section is not included but the third operation section detection data outputted from the fourth detection section is included, and outputs the second transmission data to the second communication section. The second communication section transmits, to the game apparatus, the second transmission data outputted from the third detection section.

According to another configuration example, the third detection section may generate null data having no content, instead of the third operation section detection data detected by the third detection section, and include the null data in the transmission data together with the third operation section detection data outputted from the fourth detection section.

According to another configuration example, each of the first operation section, the second operation section, and the third operation section may include two kinds of keys, a system operation key and keys other than the system operation key. The third detection section may include, in the transmission data, detection data of the system operation key among the third operation section detection data detected by the first detection section.

According to another configuration example, the number of keys included in the third operation section may be greater than the number of keys included in each of the first operation section and the second operation section.

According to another configuration example, the second game controller may include a housing having grips held by left and right hands of a player. The third operation section may include: a first stick that is provided at an upper left position in a front surface of the housing of the second game controller, which position allows the player to operate the first stick with a thumb of his/her left hand when the player holds the grips; a second stick that is provided at an upper right position in the front surface of the housing of the second game controller, which position allows the player to operate the second stick with a thumb of his/her right hand when the player holds the grips, a direction key that is provided at a position close to the center of the housing relative to the first stick on the front surface of the housing, which position allows the player to operate the direction key with the thumb of the left hand when the player holds the grips; a plurality of first type operation buttons that are provided at a position close to the center of the housing relative to the second stick on the front surface of the housing, which position allows the player to operate the first type operation buttons with the thumb of the right hand when the player holds the grips; one or more second type operation button(s) that is provided at a position close to the center of the housing relative to the first stick and the second stick on the front surface of the housing, and above the direction key and the plurality of first type operation buttons; a third type operation button that is provided at a position beneath the second type operation button(s) on the front surface of the housing, and between the direction key and the plurality of first type operation buttons; and a plurality of fourth type operation buttons provided at positions in the vicinity of left and right ends of an upper surface of the housing of the second game controller, respectively, which positions allow the player to operate the fourth type operation buttons with his/her left and right index fingers, respectively, when the player holds the grips.

Another configuration example is a game controller used for a predetermined game apparatus. The game controller includes: a communication section that wirelessly communicates with the predetermined game apparatus; a first detection section that is able to generate transmission data including a result of an input performed on a predetermined operation section; a second detection section; and an operation section that includes a plurality of keys, and is electrically connected to the first detection section and the second detection section. The first detection section and the second detection section are able to detect an input to the operation section. The second detection section outputs detection data detected by the second detection section to the first detection section. The first detection section generates the transmission data in which detection data detected by the first detection section is not included but the detection data outputted from the second detection section is included, and outputs the transmission data to the communication section. The communication section transmits, to the game apparatus, the transmission data outputted from the first detection section.

Advantageous Effects of the Invention

According to the above configuration, it is possible to provide a game controller which is easy to operate. Further, it is possible to provide a game controller that utilizes software asset of a subordinate model, and therefore realizes reduction in the hardware cost.

BRIEF DESCRIPTION OF THE DRAWINGS

FIG. 7A is a diagram illustrating a left side view of a game controller.
FIG. 7B is a diagram illustrating a front view of the game controller.
FIG. 7C is a diagram illustrating a right side view of the game controller.
FIG. 7D is a diagram illustrating a rear view of the game controller.
FIG. 7E is a diagram illustrating a top view of the game controller.
FIG. 7F is a diagram illustrating a bottom view of the game controller.

DESCRIPTION OF EMBODIMENTS

Figure 1:
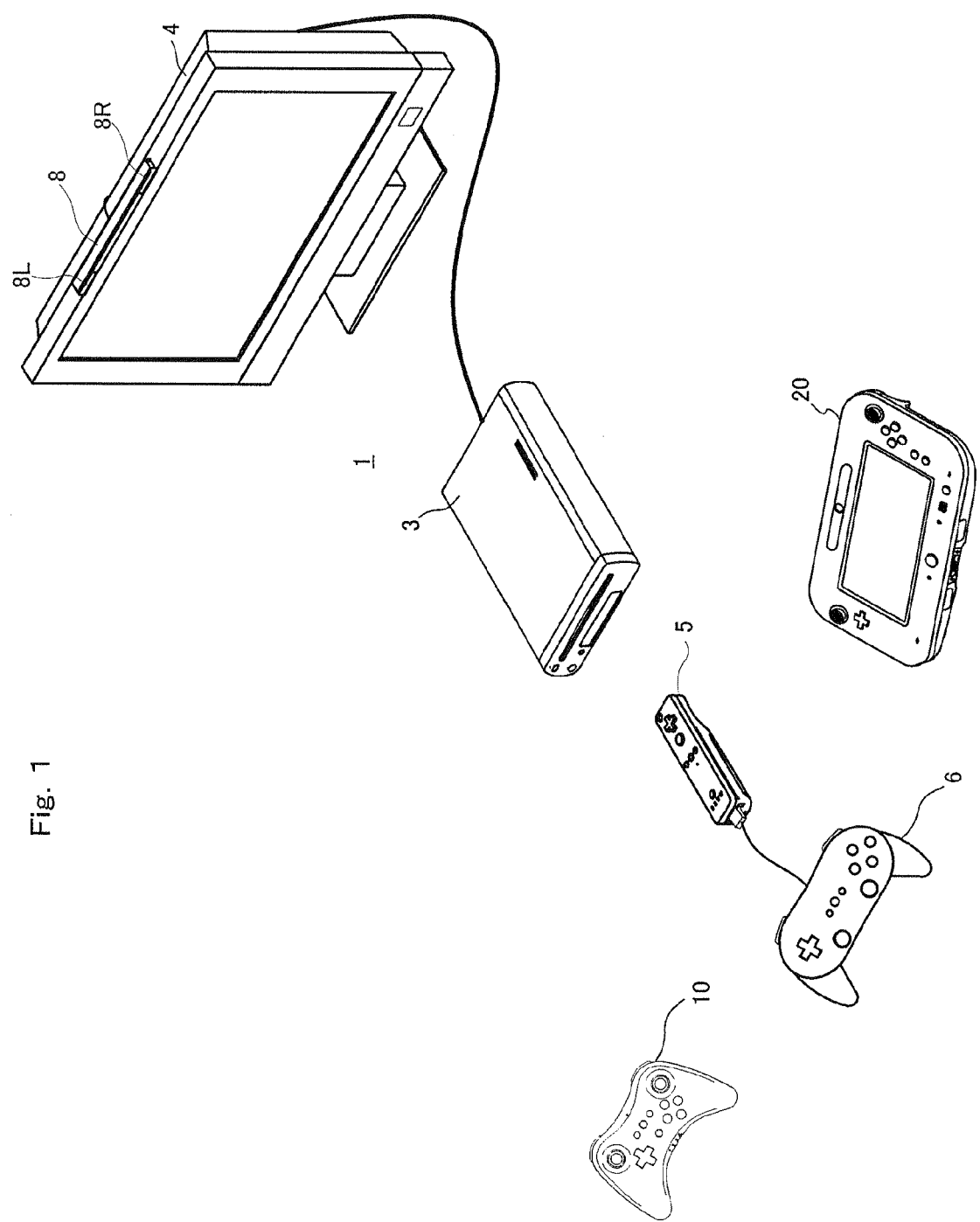
FIG. 1 is an external view of a game system 1.

A game system 1 including a game apparatus according to an embodiment of the present invention will be described with reference to FIG. 1. FIG. 1 is an external view of the game system 1. Hereinafter, a game apparatus and a game program according to the present embodiment will be described, taking a stationary game apparatus as an example. Referring to FIG. 1, the game system 1 includes a television receiver (hereinafter referred to simply as a "television") 2, a game apparatus 3, a first controller 5, a second controller 10, a third controller 20, and a marker section 8. Each of the first controller 5, the second controller 10, and the third controller 20 includes a communication section capable of wireless communication, and is wirelessly connected to the game apparatus 3 when it is used. As for a communication standard and a protocol adopted for the wireless communication, the first controller 5 and the second controller 10 adopt the same communication standard and the same protocol, while the third controller 20 adopts a communication standard and a protocol different from those of the first and second controllers 5 and 10. The first controller 5 and the second controller 10 communicate with the game apparatus 3 by using, for example, "Bluetooth (registered trademark)" as a communication standard, and a proprietary first protocol as a protocol. The third controller 20 communicates with the game apparatus 3 by using, for example, "WiFi Direct" and a proprietary second protocol.

Further, an extended controller 6 is wire-connected to the first controller 5 via a connector 53 described later. In this system, a game process is executed on the game apparatus 3 based on a game operation using the first controller 5, the second controller 10, and the third controller 20. These controllers can be used in combination (simultaneously). For example, if each of three players uses one of the controllers, the three players can play a game simultaneously.

The game apparatus 3 has downward compatibility with another existing game apparatus (not shown). In other words, the game apparatus 3 has compatibility with the another game apparatus (hereinafter referred to as a subordinate model), and has improved performance (that is, the game apparatus 3 corresponds to a superordinate model). The first controller 5 is identical to a controller that is used as a standard controller of the subordinate model (the extended controller 6 can also be used as an extended controller of the subordinate model). That is, the first controller 5 is a controller that can be used by (that is compatible with) both the game apparatus 3 of the present embodiment and the subordinate model.

Note that the second controller 10 and the third controller 20 cannot be used by the subordinate model. For example, the second controller 10 is allowed to establish wireless communication with the subordinate model (because the second controller 10 and the subordinate model use the same communication standard). However, after wireless connection has been established, the second controller 10 recognizes that the connection destination is the subordinate model, and performs a control to disconnect the wireless connection. Thus, the second controller 10 cannot be substantially used by the subordinate model.

Figure 2:
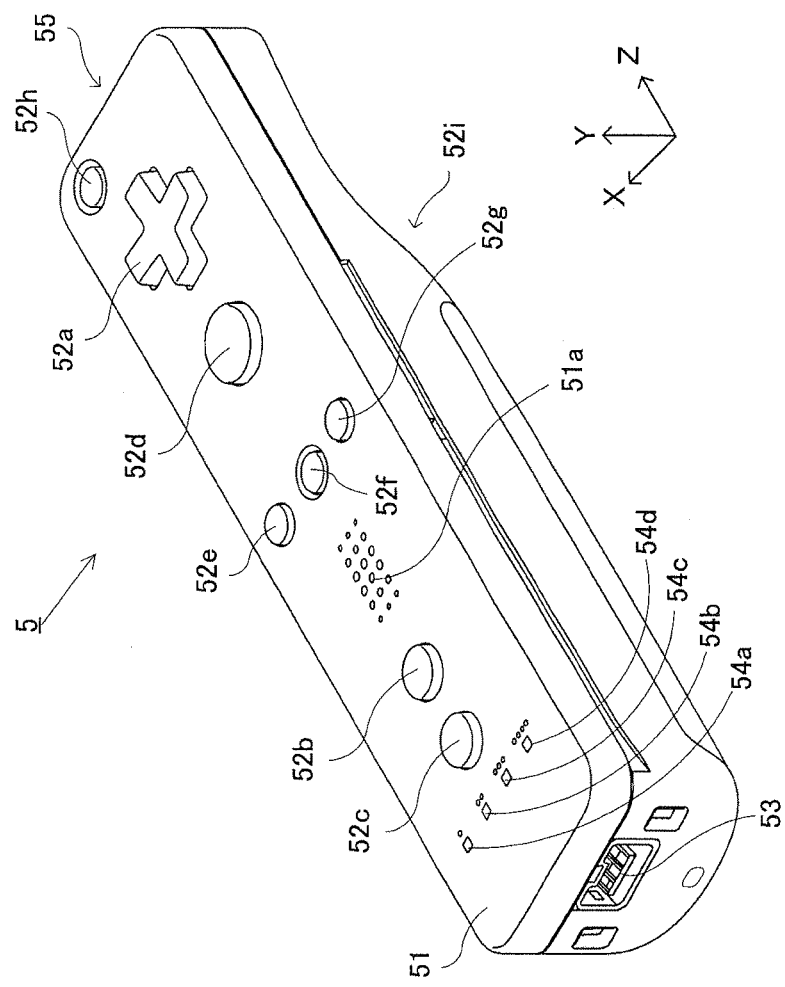
FIG. 2 is a perspective view illustrating an external configuration of a first controller 5.

Next, the first controller 5 will be described with reference to FIG. 2. FIG. 2 is a perspective view of the first controller 5 seen from a top rear side thereof.

With reference to FIG. 2, the first controller 5 includes a housing 51 and an operation section 52 including a plurality of operation buttons provided on the surface of the housing 51. The housing 51 of the present embodiment has a substantially parallelepiped shape extending in a longitudinal direction from front to rear. The overall size of the housing 51 is small enough to be held by one hand of an adult or even a child. For example, the housing 51 is formed by plastic molding.

At the center of a front part of a top surface of the housing 51, a cross key 52a is provided. The cross key 52a is a cross-shaped four-direction push switch. The cross key 52a includes operation portions corresponding to four directions (front, rear, right and left), which are respectively located on cross-shaped projecting portions arranged at intervals of 90 degrees. A player selects one of the front, rear, right and left directions by pressing one of the operation portions of the cross key 52a. Through an operation of the cross key 52a, the player can, for example, indicate a direction in which a player character or the like appearing in a virtual game world is to move, or give an instruction to select one of a plurality of options.

The cross key 52a is an operation section for outputting an operation signal in accordance with the above-described direction input operation performed by the player. However, such an operation section may be provided in another form. For example, the cross key 52a may be replaced with an operation section that has four push switches extending in four directions corresponding to a cross, and may output an operation signal in accordance with one of the four push switches pressed by the player. In addition to the four push switches, a center switch may be provided at the center of the four push switches to form a composite operation section including the four push switches and the center switch. Alternatively, the cross key 52a may be replaced with an operation section which includes an inclinable stick (so-called a joystick) projecting from a top surface of the housing 51 and which outputs an operation signal in accordance with an inclining direction of the stick. Still alternatively, the cross key 52a may be replaced with an operation section which includes a disc-shaped and horizontally slidable member and which outputs an operation signal in accordance with a sliding direction of the disc-shaped member. Still alternatively, the cross key 52a may be replaced with a touch pad.

Behind the cross key 52a on the top surface of the housing 51, a plurality of operation buttons 52b to 52g are provided. Each of the operation buttons 52b to 52g is an operation section for outputting an operation signal assigned thereto, when the player presses a head thereof. For example, functions as a No. 1 button, a No. 2 button, and an A button are assigned to the operation buttons 52b to 52d, respectively. Also, functions as a minus button, a home button, and a plus button are assigned to the operation buttons 52e to 52g, respectively. Operation functions are assigned to the operation buttons 52b to 52g in accordance with a game program executed by the game apparatus 3. In an exemplary arrangement shown in FIG. 2, the operation buttons 52b to 52d are arranged in a line at the center on the top surface of the housing 51 in a front-rear direction. The operation buttons 52e to 52g are arranged on the top surface of the housing 51 in a line in a left-right direction between the operation buttons 52b and 52d. The operation button 52f has a top surface thereof buried in the top surface of the housing 51, so as not to be inadvertently pressed by the player.

In front of the cross key 52a on the top surface of the housing 51, an operation button 52h is provided. The operation button 52h is a power switch for turning on or off the body of the game apparatus 3 by remote control. The operation button 52h also has a top surface buried in the top surface of the housing 51, so as not to be inadvertently pressed by the player.

Behind the operation button 52c on the top surface of the housing 51, a plurality of LEDs 54a to 54d are provided. Here, a controller type (number) is assigned to the first controller 5 such that the controller 5 is distinguishable from other controllers (the second controller 10, the third controller 20, and other first controllers 5). For example, the LEDs 54a to 54d are used for informing the player of the controller type that is currently set in the first controller 5. Specifically, when the first controller 5 transmits transmission data to the game apparatus 3, one of the plurality of LEDs 54a to 54d is turned on in accordance with the controller type.

On the top surface of the housing 51, sound holes for outputting sound from a speaker to the external space are formed between the operation button 52b and the operation buttons 52e to 52g.

On a back surface of the housing 51, a recessed portion is formed. The recessed portion on the back surface of the housing 51 is formed in a position in which an index finger or middle finger of the player is positioned when the player holds the first controller 5 with one hand and points a front portion thereof to the markers 8L and 8R. On a slope surface of the recessed portion, an operation button 52i (not shown in the figure) is provided. The operation button 52i is an operation section acting as, for example, a B button.

On the top surface of the housing 51, an image pickup element 55 forming a part of an imaging information calculation section 59 described later is provided. The imaging information calculation section is a system for: analyzing image data of an image taken by the first controller 5; identifying an area having a high brightness in the image; and detecting a position of a center of gravity, a size and the like of the area. The imaging information calculation section

59 has, for example, a maximum sampling period of approximately 200 frames/sec, and therefore, can trace and analyze even a relatively fast motion of the first controller 5.

On the rear surface of the housing 51, a connector 53 is provided. The connector 53 is, for example, an edge connector, and is used for engaging and connecting the extended controller 6 or the like with a connection cable.

Figure 3:
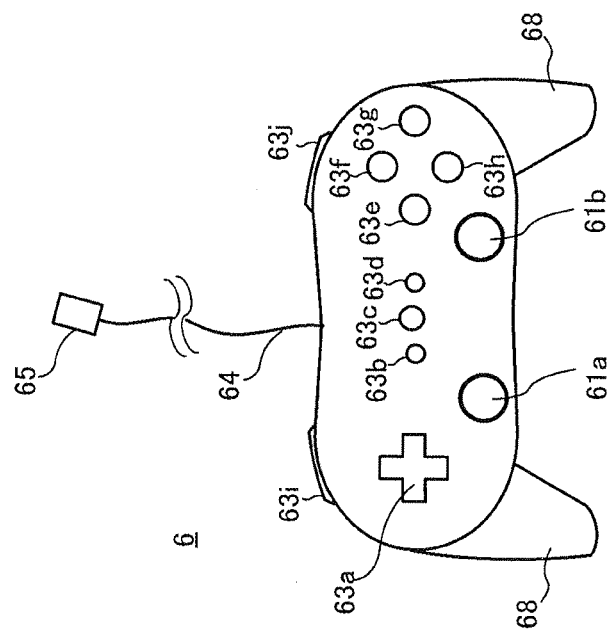
FIG. 3 is a diagram illustrating an external configuration of an extended controller 6.

Next, the extended controller 6 will be described. The extended controller 6 is a game controller that is held and operated with both hands. As shown in FIG. 3, the extended controller 6 includes two analog sticks 61*a* and 61*b*, a cross key 63*a*, and operation buttons 63*b* to 63*h*, on a front surface of a housing having left and right grips 68. The two analog sticks are provided on the lower side of the front surface of the housing (near the bottom surface of the housing). The cross key 63*a* is positioned above the analog stick 61*a*, and the operation buttons 63*e* to 63*h* are positioned above the analog stick 61*b*. The operation buttons 63*b* to 63*d* are positioned above the analog sticks 61*a* and 61*b* and between the cross key 63*a* and the operation buttons 63*e* to 63*h*.

Operation buttons 63*i* and 63*j* are provided at positions on an upper surface of the housing, which positions are reached by left and right index fingers when the extended controller 6 is held with both hands, respectively. Further, operation buttons 63*k* and 63*l* (not shown) are provided on the back surface side relative to the operation buttons 63*i* and 63*j*, respectively. Further, a connection cable 64 extends from the upper surface of the housing, and a connector 65 for connecting the extended connector 6 to the connector 53 of the first controller 5 is provided at an end of the connection cable. By connecting the extended controller 6 to the first controller 5 via the connection cable 64, the extended controller 6 becomes usable. Specifically, as described later, the content of operation performed on the extended controller 6 is transmitted to the first controller 5 (a first control section 56 described later), and the first controller 5 generates transmission data based on the content of operation, and thereby the content of operation is transmitted from the first controller 5 to the game apparatus 3.

Figure 4:
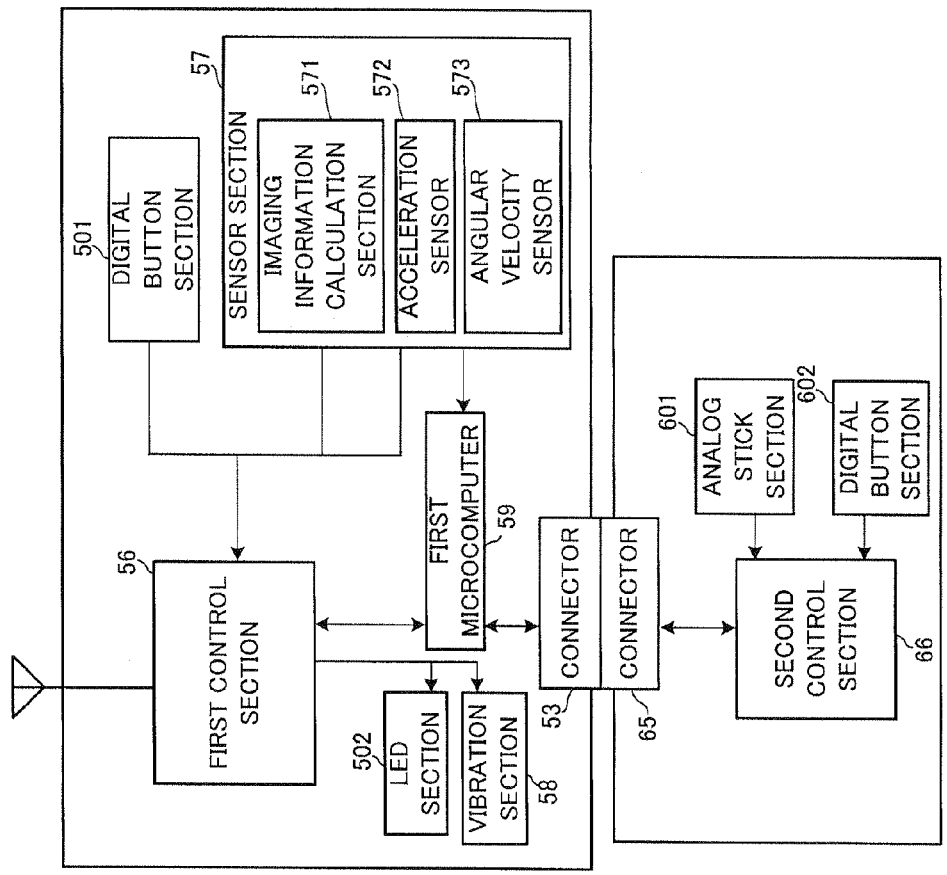
FIG. 4 is a block diagram illustrating internal configurations of the first controller 5 and the extended controller 6.

Next, the internal configurations of the first controller 5 and the extended controller 6 connected to the first controller 5 will be described with reference to FIG. 4. FIG. 4 is a block diagram illustrating the configurations of the first controller 5 and the extended controller 6 connected to the first controller 5.

With reference to FIG. 4, the first controller 5 includes a first control section 56, a digital button section 501 corresponding to the above-mentioned cross key 52*a* and operation buttons 52*b* to 52*i*, a sensor section 57, an LED section 502 corresponding to the above-mentioned LEDs 54*a* to 54*d*, a vibration section (vibrator) 58, a first microcomputer 59, and a connector 53. The first controller 5 further includes a speaker, a sound IC, a battery, and the like, which are not shown in FIG. 4.

The sensor section 57 includes an imaging information calculation section 571, an acceleration sensor 572, and an angular velocity sensor 573. The imaging information calculation section 571 includes an infrared filter, a lens, an image pickup element 55, and an image processing circuit, which are not shown in FIG. 4. The infrared filter allows only infrared light to pass therethrough, among light incident on the front surface of the first controller 5. The markers 8L and 8R provided in the vicinity of the display screen of the television 2 are infrared LEDs each outputting infrared light forward from the television 2. Therefore, by providing the infrared filter, images of the markers 8L and 8R can be taken accurately. The lens converges the infrared light that has passed through the infrared filter, and outputs the infrared light to the image pickup element 55. The image pickup element 55 is a solid-state image pickup element such as a CMOS sensor and a CCD, and takes an image of the infrared light converged by the lens. Accordingly, the image pickup element 55 takes an image of only the infrared light that has passed through the infrared filter, and generates image data of the image. The image data generated by the image pickup element is processed by the image processing circuit. The image processing circuit calculates the position of an imaging target (the markers 8L and 8R) in the taken image. Further, the image processing circuit outputs the position of the imaging target to the first control section 56.

The acceleration sensor 572 detects an acceleration (including gravitational acceleration) of the first controller 5, that is, detects a force (including gravity) applied to the first controller 5. Then, the acceleration sensor 572 outputs the detected acceleration to the first control section 56. Further, the angular velocity sensor 573 detects an angular velocity (per unit time) with respect to a yaw angle (an angular velocity around the Y axis), an angular velocity (per unit time) with respect to a roll angle (an angular velocity around the Z axis), and an angular velocity (per unit time) with respect to a pitch angle (an angular velocity around the X axis). The angular velocity sensor 573 outputs the detected angular velocities to the first microcomputer 59.

The first control section 56 includes a memory, a wireless module, an antenna, and the like. With the use of the memory as a storage area during the process, the first control section 56 controls the wireless module that wirelessly transmits transmission data to the game apparatus 3. Further, the first control section 56 controls the operations of the LED section 502, the vibration section 58, the sound IC, and the like, based on data received by the wireless module from the game apparatus 3 via the antenna. Further, the first control section 56 is connected to the first microcomputer 59. The first microcomputer 59 is connected to the angular velocity sensor 573. The first microcomputer 59 detects an input to the angular velocity sensor 573, and notifies the first control section 56 of the detected input. Therefore, the first control section 56 can obtain, via the first microcomputer 59, data outputted from the angular velocity sensor 573. The first microcomputer 59 is further connected to the connector 53. That is, the first microcomputer 59 is connected to a second control section 66 of a later-described extended controller 6 via the connector 53, and therefore can obtain data (operation data and the like regarding the extended controller 6) outputted from the second control section 66. Then, the first microcomputer 59 outputs, to the first control section 56, the data obtained from the second control section 66. Based on these pieces of data, the first control section 56 generates data indicating the content of operation (transmission data 300 described later), and transmits the transmission data to the game apparatus 3 by using the wireless module (generation of the transmission data will be described later in detail). Thus, it is possible to notify the game apparatus 3 of the contents of operations performed on the first controller 5 and the extended controller 6.

In the exemplary configuration shown in FIG. 4, data outputted from the digital button section 501 is directly input to the first control section 56. However, the first microcomputer 59 may be provided between the first control section 56 and the digital button section 501. That is, the first microcomputer 59 may detect an operation performed on the digital button section 501, and notify the first control section 56 of the detected operation. In this case, a combination of the first control section 56 and the first microcomputer 59 can be regarded as a detection section having a function of detecting operations on the operation sections such as the digital button section 501.

Further, in FIG. 4, the extended controller 6 includes a second control section 66, an analog stick section 601 corresponding to the analog sticks 61*a* and 61*b*, a digital button section 602 corresponding to the cross key 63*a* and the operation buttons 63*b* to 63*l*, and a connector 65.

The second control section 66 detects inputs to the analog stick section 601 and the digital button section 602, and generates extended controller data 308 described later. Then, the second control section 66 outputs the generated data to the first control section 56 via the connector 65 and the first microcomputer 59.

Note that the extended controller 6 itself does not have a battery or the like, and is supplied with power from the battery of the first controller 5 via the connector 65.

Next, transmission data transmitted from the first controller 5 to the game apparatus 3 will be described. The transmission data mainly includes data indicating the contents of operations performed on the first controller 5 and the extended controller 6 by the player (data indicating a remaining battery level or the like is also included). In the present embodiment, as for a data format (which defines data to be included, the length of the data, and the like, and is referred to simply as "format" hereinafter) of the transmission data, a plurality of formats have been defined in advance, and a developer is allowed to select and use any of the plurality of formats depending on the content of a game to be developed.

Figure 5:
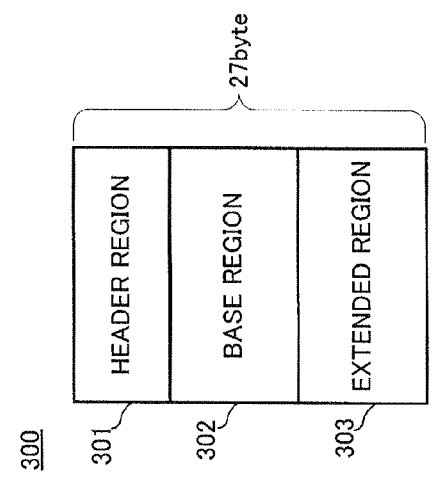
FIG. 5 illustrates an exemplary structure of transmission data 300.

FIG. 5 illustrates an example of a format of the transmission data 300, which is used in the present embodiment. The transmission data 300 consists of a header region 301, a base region 302, and an extended region 303. In the present embodiment, the transmission data 300 is, for example, data having a fixed length of 27 bytes. In the present embodiment, whichever format is used, the byte length of the header region is fixed to 6 bytes (the lengths of the base region 302 and extended region 303 vary depending on the used format). Further, whichever format is used, at least the header region 301 is included in the transmission data 300.

In the header region 301, information (header information) including, for example, an ID for uniquely identifying the plurality of formats is stored. In the base region 302, data indicating the pressing state of the digital button section 501 is stored. Data stored in the extended region 303 appropriately varies depending on, for example, the game content executed by the game apparatus 3 (in other words, an appropriate format is used according to the game content). For example, in a certain game process (a certain format), acceleration data obtained from the acceleration sensor 572 and angular velocity data obtained from the angular velocity sensor 573 are stored in the extended region 303. In another game, data indicating the coordinates of the imaging target, which is obtained from the imaging information calculation section 571, is stored in the extended region 303. In still another game, the acceleration data, the angular velocity data, and the data indicating the coordinates of the imaging target are stored in the extended region 303. As shown in FIG. 1, when the extended controller 6 is connected to the first controller 5 and a format that uses the extended controller 6 is designated, data indicating the content of operation performed on the extended controller 6 is stored in the extended region 303.

Figure 6:
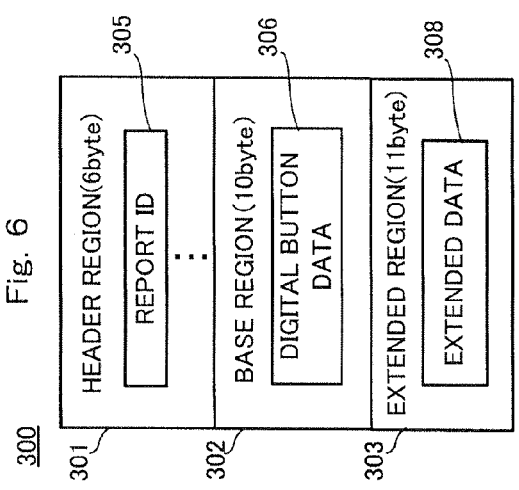
FIG. 6 illustrates an exemplary structure of transmission data 300.

The present embodiment will be described for the case where the extended controller 6 is connected to the first controller 5. That is, the present embodiment will be described on assumption that, among the plurality of formats, the format is selected and used in which the data indicating the content of operation performed on the extended controller 6 is stored in the extended region 303. Specifically, as an example of a format of the transmission data 300, a format shown in FIG. 6 is used. In this format, it is defined that the header region 301 has 6 bytes, the base region 302 has 10 bytes, and the extended region 303 has 11 bytes. Since the first controller 5 can be used by (is compatible with) the subordinate model as described above, this format can also be used by the subordinate model. In other words, the format used by the subordinate model is used in the game process (game development) of the game apparatus 3.

In FIG. 6, a report ID 305 that is an ID for uniquely identifying the plurality of formats is stored in the header region 301. In addition, information that allows the game apparatus 3 to identify the controller is appropriately stored in the header region 301.

In the base region 302, digital button data 306 indicating the pressing state of the digital button section 501 is stored. The data stored in the base region 302 is generated by the first control section 56 based on the output from the digital button section 501.

In the extended region 303, extended controller data 308 (hereinafter simply referred to as extended data) is stored. The extended data 308 is generated by the second control section 66 based on the outputs from the digital button section 602 and the analog stick section 601 of the extended controller 6. That is, the extended data 308 indicates the content of operation performed on the extended controller 6. The generated extended data 308 is outputted from the second control section 66 to the first control section 56 (via the connector 65).

The first control section 56 stores, in the extended region 303, the extended data 308 transmitted from the second control section 66 as well as the data stored in the base region 302, and sets, in the header region 301, the report ID 305 corresponding to the format shown in FIG. 6, thereby generating the transmission data 300. Then, the first control section 56 transmits the transmission data 300 to the game apparatus 3 to notify the game apparatus 3 of the contents of operations performed on the first controller 5 and the extended controller 6 by the player.

In the above-described embodiment, only the header region 301 has a fixed length. However, in another embodiment, the base region 302 and the extended region 303 may have fixed lengths (data to be stored therein appropriately varies).

Hereinafter, the second controller 10 will be described. FIG. 7 illustrates an external view of the second controller 10. FIG. 7A is a left side view of the second controller 10, FIG. 7B is a front view of the second controller 10, FIG. 7C is a right side view of the second controller 10, FIG. 7D is a rear view of the second controller 10, FIG. 7E is a top view of the second controller 10, and FIG. 7F is a bottom view of the second controller 10. The second controller 10 mainly includes: a housing 102 having left and right grips 103L and 103R (hereinafter also collectively referred to as grips 103); and an operation section that includes two analog sticks projecting from openings provided at a front surface of the housing 102, and a plurality of operation buttons (described later). The housing 102 of the present embodiment, when viewed from the front side thereof, has a gentle trapezoid shape with its left-right direction being a longitudinal direction. The housing 102 is a little recessed at its upper side, and is recessed more at its lower side than at the upper side. In other words, the housing 102 is shaped such that the grips 103L and 103R extend toward the bottom surface side (toward the player when he/she holds the controller). The front surface of the housing 102 is substantially flat except the portions where the analog sticks are provided. The portions where the analog sticks are provided are slightly raised. The grips 103L and 103R are shaped so as to gently curve from the front surface to the back surface. Note that the housing 102 of the present embodiment is formed by plastic molding, for example.

A first analog stick 111 (hereinafter referred to as a left stick) is provided on the left end of the front surface of the housing 102 and in the vicinity of the upper surface of the housing 102, and a second analog stick 112 (hereinafter referred to as a right stick) is provided on the right end of the front surface of the housing 102 and in the vicinity of the upper surface of the housing 102. More specifically, the left stick 111 is provided at a position that allows a player to operate the left stick 111 with a thumb of his/her left hand that holds the grip 103L (more preferably, a position on which the thumb of the left hand that holds the grip 103L is naturally put). The right stick 112 is provided at a position that allows the player to operate the right stick 112 with a thumb of his/her right hand that holds the grip 103R (more preferably, a position on which the thumb of the right hand that holds the grip 103R is naturally put). Each of the left stick 111 and the right stick 112 is a stick that can be tilted down to an arbitrary direction chosen from a 360° range, and is used by the player to give an instruction about an arbitrary direction. Further, each of the left stick 111 and the right stick 112 can be pushed toward the back surface. Thus, the left stick 111 and the right stick 112 also serve as push buttons. The left stick 111 and the right stick 112 act in accordance with a program executed by an information processing apparatus (e.g., a game apparatus) to which the controller is connected. Since the interval between the left stick 111 and the right stick 112 is increased as compared to the conventional controller, even when the player tilts down the left stick 111 and the right stick 112 toward the center of the housing 102, the interval between the left and right thumbs of the player is not narrow, which allows the player to perform operations easily.

A cross key (also referred to as a direction key) 21 is provided at a position to the left of the substantial center position on the front surface of the housing 102, and near the center position relative to the left stick 111, at which the player is allowed to operate the cross key with the thumb of the left hand that holds the grip 103L. Specifically, the cross key 121 is provided at a position to the right of and beneath the left stick 111. The cross key 121 is a cross-shaped four-direction push switch. The cross key 121 includes operation portions corresponding to the four directions (front, rear, right and left), which are respectively located on cross-shaped projecting portions arranged at intervals of 90 degrees. The player selects one of the front, rear, right, and left directions by pressing one of the operation portions of the cross key 121. The cross key 121 acts in accordance with a program executed by an information processing apparatus (e.g., a game apparatus) to which the controller is connected. The shape of the cross key 121 is not limited to that shown in FIG. 7B. The cross key 121 may have any shape as long as it allows the player to input the four directions. For example, the cross key 121 may have a shape of a round base with a protruding cross shape, or may be a set of four keys separated from each other.

Further, operation buttons 122A to 122D (hereinafter also referred to as a first operation button set) are positioned so as to form a cross shape, i.e., positioned rightward, downward, leftward, and upward, respectively, in an area to the right of the substantial center of the front surface of the housing 102, and near the center of the housing 102 relative to the right stick 112, at which the player is allowed to operate the operation buttons 122A to 122D with the thumb of the right hand that holds the grip 103R. More specifically, the operation buttons 122A to 122D are positioned so as to form a cross shape, i.e., positioned rightward, downward, leftward, and upward, respectively, in an area to the left of and beneath the right stick 112. The operation buttons 122A to 122D are appropriately assigned functions, respectively, in accordance with a program executed by the information processing apparatus to which the second controller 10 is connected. For example, the operation buttons 122A to 122D are used for determination operation, cancellation operation, and the like.

As described above, since the cross key 121 is positioned to the right of and beneath the left stick 111, the ball of the thumb of the left hand of the player reaches the position of the cross key 121 when the player moves the thumb with the base of the thumb being a fulcrum point. In other words, the player is allowed to move the ball of the thumb to the position of the cross key 121 by only moving the thumb to the right with the base of the thumb being a fulcrum point, without particularly changing the position of holding the grip 103L. In addition, the player is allowed to return the thumb to the position of the left stick 111 by moving the thumb to the left. That is, the player is allowed to easily move the thumb between the left stick 111 and the cross key 121, thereby improving the operability. In other words, when the player operates the cross key 121, it is possible to avoid the situation that the stick is positioned between the tip of the thumb (the position of the cross-key) and the base of the thumb, and impedes the player's operation, which results in reduction in the operability.

Likewise, since the first operation button set (operation buttons 122A to 122D) is positioned to the left side of and beneath the right stick 112, the player is allowed to move the thumb of the right hand between the right stick 112 and the first operation button set by only moving the thumb with the base of the thumb being a fulcrum point. Thereby, the player is allowed to easily move the thumb between the right stick 112 and the first operation button set, and thus the operability is improved.

An L button 125L is provided at the left end of the upper surface of the housing 102 and near the front surface of the housing 102, and a ZL button 126L is provided beneath the L button 125L (near the back surface relative to the L button 125L). An R button 125R is provided at the right end of the upper surface of the housing 102 and near the front surface of the housing 102, and a ZR button 126R is provided beneath the R button 125R (near the back surface relative to the R button 125R). The L button 125L is provided at a position reached by an index finger of a left hand that holds the grip 103L, and the ZL button 126L is provided at a position reached by a middle finger and a ring finger of the left hand. The R button 125R is provided at a position reached by an index finger of a right hand that holds the grip 103R, and the ZR button 126R is provided at a position reached by a middle finger and a ring finger of the right hand. The L button 125L, the R button 125R, the ZL button 126L, and the ZR button 126R are appropriately assigned functions, respectively, in accordance with a program executed by the information processing apparatus.

Further, system operation buttons 123A to 123C are provided at a position in the center of the front surface of the housing 102, near the upper surface of the housing 102, and between the left stick 111 and the right stick 112. The system operation buttons 123A to 123C (hereinafter also referred to as a second operation button set) are assigned functions as a minus button, a home button, a plus button, and the like. These system operation buttons 123A to 123C are assigned operation functions, respectively, in accordance with a program executed by the information processing apparatus to which the second controller 10 is connected. In the present embodiment, for example, operations to be directly controlled by the system of the game apparatus are assumed. For example, when the home button 123B is pressed, game processing, even if it is being executed, is stopped, and the screen is changed to the home screen. When the minus button 123A or the plus button 123C is pressed, the image displayed in the home screen is changed (paging or scrolling is performed). Since the left stick 111 and the right stick 112 are positioned near the both ends of the upper surface, respectively, a sufficient space is secured between the sticks, and a plurality of system operation buttons can be provided in the space such that the sticks do not impede the player from operating the system operation buttons.

Further, a power operation button 128 is provided at a position in the center of the front surface of the housing 102, near the bottom surface of the housing 102, and between the cross key 121 and the operation buttons 122A to 122D (first operation button set). In other words, the cross key 121 and the first button set are spaced apart from each other at a certain interval in the left-right direction (horizontal direction) in FIG. 7B, and the power operation button 128 is positioned between (in FIG. 7B, in the middle between) the cross key 121 and the first button set. The power operation button 128 is a power switch for remote-controlling the power of the information processing apparatus body to be on and off. The power operation button 128 has a top surface buried in the front surface of the housing 102 so as not to be inadvertently pressed by the player. Since the left stick 111 and the right stick 112 are positioned near the upper surface, the player need not move his/her fingers beyond the sticks when pressing the system operation buttons 123A to 123C or the power operation button 128, and thus the player can easily press the buttons.

Further, a plurality of indicators are provided on the front surface of the housing 102 and near the bottom surface relative to the power operation button 128. Specifically, LEDs 131A to 131D are provided. A plurality of controllers may be connected to the information processing apparatus to which the controller 10 is connected. A controller type (number) is assigned to the second controller 10 such that the second controller 10 is distinguishable from other controllers. The LEDs 131A to 131D are used for informing the player of the controller type that is currently set in the second controller 10. The controller number is instructed from the information processing apparatus. Specifically, while the second controller 10 is communicating with the information processing apparatus, one of the plurality of LEDs 131A to 131D is turned on in accordance with an instruction from the information processing apparatus. The LEDs 131A to 131D are provided between and beneath the cross key 121 and the operation buttons 122A to 122D, and the space between the cross key 121 and the operation buttons 122A to 122D is increased at the lower side due to the arrangement of the operation buttons 122A to 122D, and therefore, a sufficient space for providing the plurality of LEDs is secured at the lower side. Further, while there is a case where the player moves the fingers inward beyond the positions of the sticks when operating the sticks, it is rare that the player moves the fingers inward beyond the positions of the buttons when operating the buttons, and therefore, the plurality of LEDs are less likely to be covered with the fingers during the operation. Accordingly, the LEDs are highly visible during the operation.

Further, a charging indicator 132 is provided near the upper surface of the housing 102 relative to the second operation button set. The charging indicator 132 is used for informing the player of the remaining battery level of the second controller 10, and the state of charge of the second controller 10, for example. For example, the charging indicator 132 can inform the player of the state of charge by using colors of an LED. In contrast to the LEDs 131A to 131D, the charging indicator 132 of the present embodiment is solely provided in a broad area on the housing, which area is not likely to be covered with the player's hand during the operation, and therefore, is noticeable, which allows the player to easily find a change of the indicator, for example, a change in the color of the indicator. Accordingly, the player easily recognizes a reduction in the remaining battery level.

Further, as shown in FIG. 7E, a charging connector 133 is provided at a position in the center of the upper surface of the housing 102 and near the front surface of the housing 102. The charging connector 133 is, for example, a connector corresponding to a mini USB terminal, and is capable of charging the second controller 10 when it is connected to a power supply by using a predetermined cable.

Further, as shown in FIG. 7D, on the back surface of the housing 102, a battery cover 135 is provided in a center area sandwiched between the left and right grips. A battery is stored inside the cover. Further, the center area of the housing 102 (hereinafter referred to as a battery storage area) is recessed relative to the left and right grips and the area where the ZL button 126L and the ZR button 126R are present (refer to FIGS. 7A, 7C, 7E, and 7F). That is, the center area where the battery is stored is recessed, and only this area is reduced in thickness (in other words, only the grips 103L and 103R and the area where the ZL button 126L and the ZR button 126R are stored are raised). In the conventional art, since the sticks are positioned near the center of the housing, the thickness of the center portion of the housing is somewhat increased due to influence of the sizes of parts, and the like. In contrast, in the present embodiment, since the left stick 111 and the right stick 112 are provided outward when viewed from the back surface (near the both ends of the front surface), the thickness of the center area is reduced, which allows the player to easily hold the housing 102. Further, two small holes are opened in an upper end portion of the battery cover 135. In one of the holes (the left-side hole in FIG. 7D), a connect button 136 is provided, which is used for establishing wireless connection (pairing) between the second controller 10 and the information processing apparatus. In the other hole (the right-side hole in FIG. 7D), a reset switch 137 for resetting the second controller 10 is provided.

Further, a vibrator that generates vibration based on a control signal from the information processing apparatus may be provided inside the grips 103. Preferably, the vibrator is provided inside the grip 103L. In other words, it is preferable that the vibrator be included in the left stick 111 that is supposed to be used mainly for direction input operation, or in a grip on the side where the cross key 121 is present. When the player operates the second controller 10 with his/her both hands, particularly when the player continuously operates the cross key 121, more force is applied to the left hand (the left hand holds the grip more tightly than the right hand). Therefore, it is considered that the second controller 10 is more likely to be supported by the hand which mainly performs direction control, and vibration is more likely to be transmitted to the player when the vibrator is provided in the grip 103L.

In addition, a communication section (a first control section 201 described later) for wireless communication with the information processing apparatus is also included in the housing 102.

Figure 8:
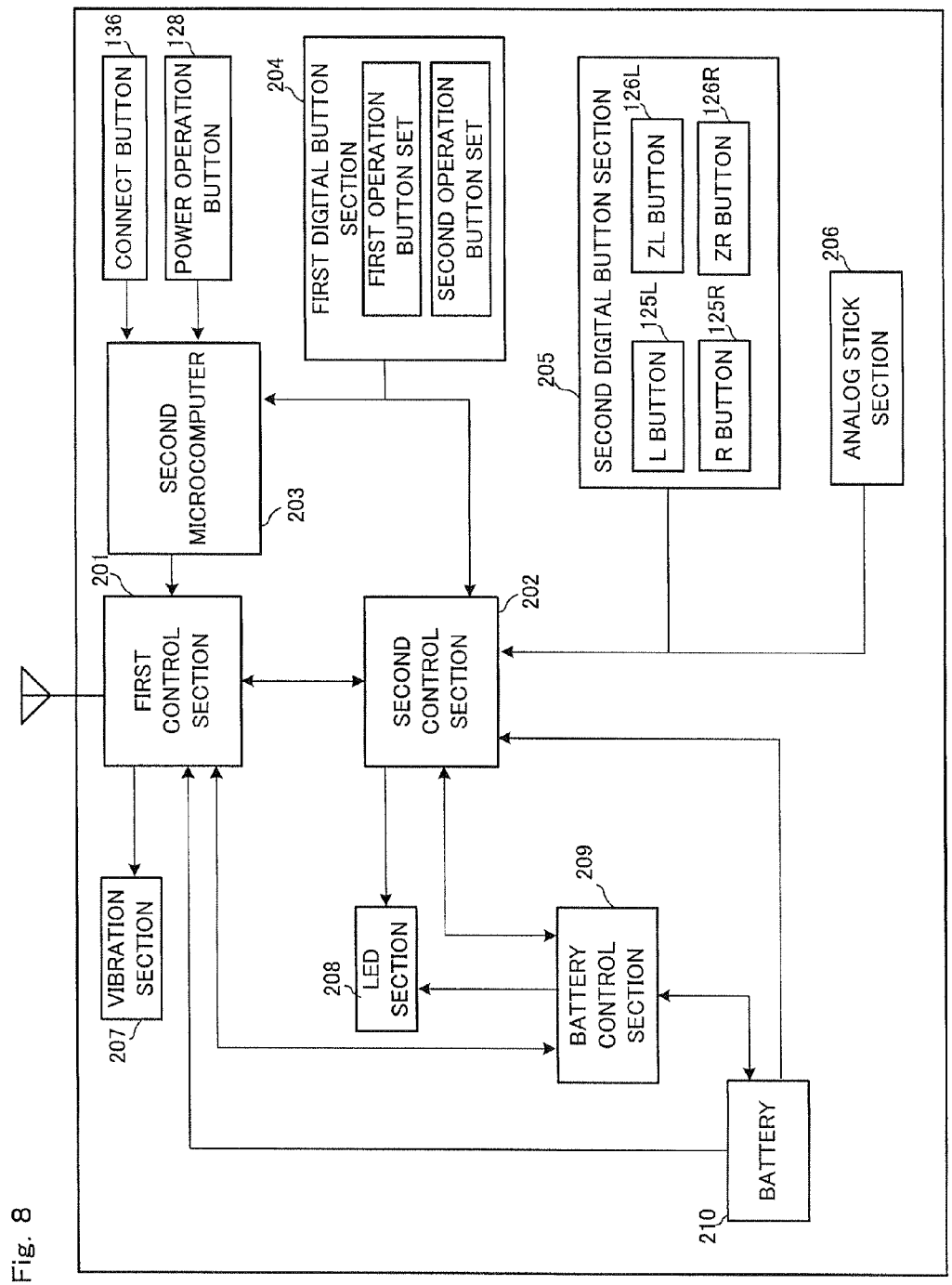
FIG. 8 is a block diagram illustrating an internal configuration of a second controller 10.

Hereinafter, the internal configuration of the second controller 10 will be described with reference to FIG. 8. FIG. 8 is a block diagram illustrating the configuration of the second controller 10. In FIG. 8, the second controller 10 includes a first control section 201, a second control section 202, a second microcomputer 203, a first digital button section 204, a second digital button section 205, an analog stick section 206 (including a function of an analog stick as a push switch), a vibration section (vibrator) 207, an LED section 208, a battery control section 209, and a battery 210. The first digital button section 204 corresponds to the first operation button set and the second operation button set (the cross key 121, the operation buttons 122A to 122D, and the system operation buttons 123A to 123C) among the plurality of digital buttons provided on the second controller 10. The second digital button section 205 corresponds to the L button 125L, the R button 125R, the ZL button 126L, and the ZR button 126R. The analog stick section 206 corresponds to the left stick 111 and the right stick 112. The LED section 208 corresponds to the LEDs 131A to 131D and the charging indicator 132. These sections are electrically connected to each other. In other words, the second controller 10 is configured by roughly integrating the hardware configurations of the first controller 5 and the extended controller 6. Further, power is supplied to each section via the battery control section 209 that is supplied with power from the battery 210.

With reference to FIG. 8, the first control section 201 is electrically connected to the second control section 202 (by a I2C bus, for example). The first control section 201 is also connected to the second microcomputer 203. The second microcomputer 203 detects an input to the first digital button section 204, and notifies the first control section 201 of the detected input. Further, the second microcomputer 203 is connected to a power operation button 128 and a connect button 136. The second microcomputer 203 detects inputs to these buttons, and notifies the first control section 201 of the detected inputs. The first control section 201 periodically confirms the input state of each button with the second microcomputer 203.

A signal indicating an input operation performed on the first digital button section 203 is output to the second microcomputer 203 and the second control section 202. The number of the buttons included in the first digital button section 204 is equal to the number of the buttons provided on the first controller 5 (except the power button). That is, regarding input operations performed on the buttons provided on the second controller 10 corresponding in number to the buttons provided on the first controller 5, the input operations can be output to both the first control section 201 (via the second microcomputer 203) and the second control section 202.

On the other hand, input operations performed on the second digital button section 205 and the analog stick section 206 are output to only the second control section 202.

The fundamental hardware configuration of the first control section 201 is substantially identical to that of the first control section 56 of the first controller 5, and includes a memory, a wireless module, and an antenna. The content of (software-like) control of the first control section 201 basically corresponds to that of the first control section 56 of the first controller 5. However, in contrast to the first control section 56, the first control section 201 in the second controller 10 does not perform such control as to include, in operation data (a base region 302 described later) to be transmitted to the game apparatus 3, the result of detection of the input operation performed on the first digital button section 204. Thus, the first control section 201 basically performs similar control to that of the first control section 56 except that software control to include, in the operation data, the input operation performed on the first digital button section 204 is not performed. That is, only by slightly changing the control, a control section that is similar in hardware (or includes similar components) to the first control section 56 can be used as the first control section 201 of the second controller 10.

Figure 9:
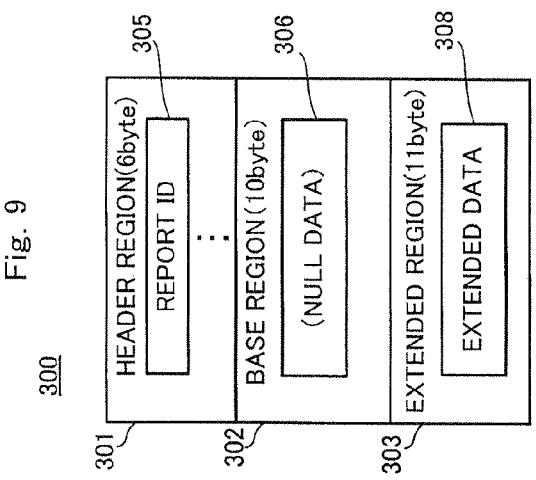
FIG. 9 illustrates an exemplary structure of transmission data 300.

Further, the first control section 201 is able to generate and transmit transmission data by using any of the plurality of formats used in the data transmission by the first controller 5 (more precisely, the first control section 201 may use a format that uses the extended region among the plurality of formats). In the present embodiment, the first control section 201 generates, as transmission data to be transmitted to the game apparatus 3, transmission data in the same format as the transmission data 300 shown in FIG. 6. That is, the first control section 201 is able to generate transmission data 300 by the format which defines that the header region 301 has 6 bytes, the base region 302 has 10 bytes, and the extended region 303 has 11 bytes. However, as described above, the first control section 201 does not perform control to include, in the base region 302, the result of detection performed on the first digital button section 203. As a result, transmission data 300 as shown in FIG. 9 is generated in which the content of data in the base region 302 is null data corresponding to 10 bytes.

The fundamental hardware configuration of the second control section 202 is identical to that of the second control section 66 in the extended controller 6, and the content of control thereof is nearly identical to that of the second control section 66. That is, the second control section 202 performs detection of inputs to the first digital button section 204 and the second digital button section 205, and detection of input to the analog stick section 206. Based on the detection results, the second control section 202 generates extended data 308. Further, the second control section 202 communicates with the battery control section 209 to obtain information indicating the remaining battery level and the charging state. The second control section 202 includes, in the extended data 308, the information obtained from the battery control section 209. Then, the second control section 202 outputs the generated extended data 308 to the first control section 201.

Figure 10:
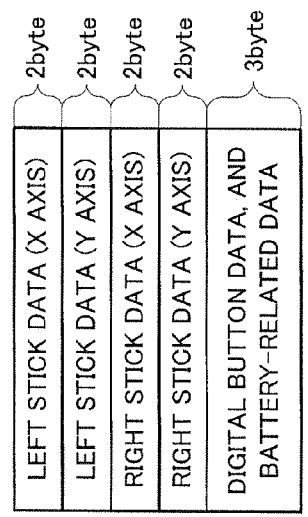
FIG. 10 illustrates an exemplary structure of extended data 308.

An example of the content of the extended data 308 generated by the second control section 202 is shown in FIG. 10. With reference to FIG. 10, data corresponding to upper 8 bytes of 11 bytes are assigned to data indicating the result of detection of input to the analog stick section 204 (specifically, 2 bytes for the X axis of the left stick 111, 2 bytes for the Y axis thereof, 2 bytes for the X axis of the right stick 112, and 2 bytes for the Y axis thereof). Data corresponding to the remaining 3 bytes are assigned to the result of detection of inputs (digital button data) to the cross key 121, the first button set, the system operation buttons 123A to 12C, the L button 125L, the R button 125R, the ZL button 126L, the ZR button 126R, and the left and right sticks 111 and 112 as push buttons, and to data (battery-related data) indicating the remaining battery level and the charging state, for example.

Figure 11:
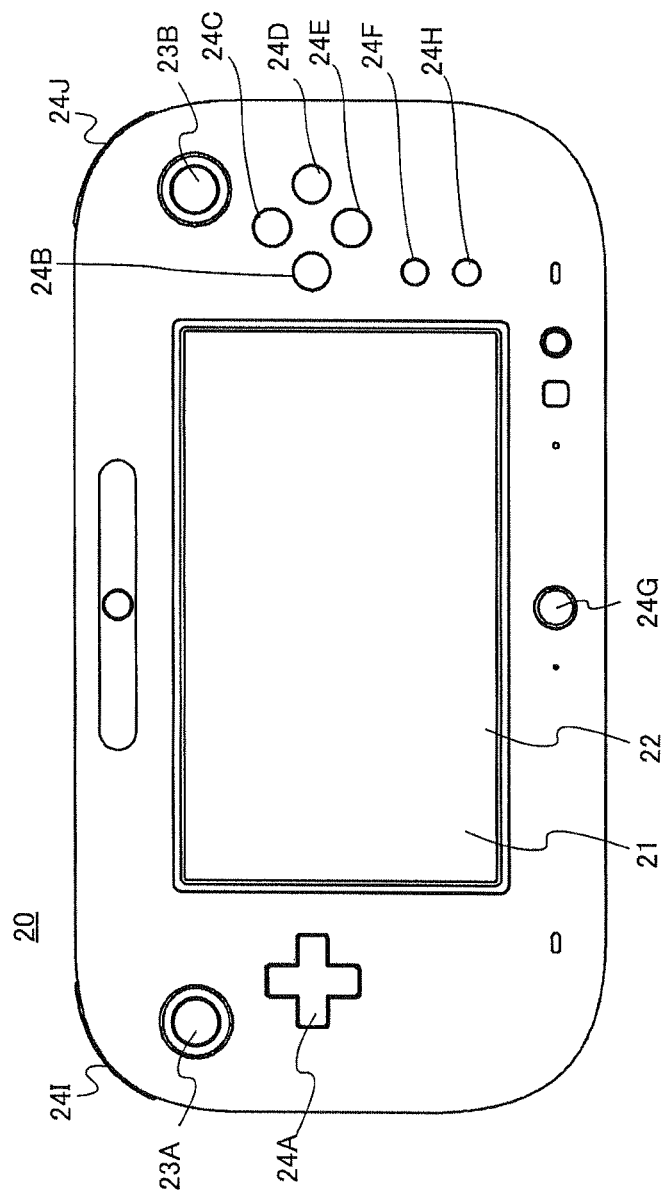
FIG. 11 is a diagram illustrating an external configuration of a third controller 20.

Next, the third controller 20 shown in FIG. 1 will be described. The third controller 20 is connected to the game apparatus 3 by using a wireless communication protocol different from that used by the first controller 5 and the second controller 10, and can be used in combination with the first controller 5 and the second controller 10. As shown in FIG. 11, the third controller 20 includes a housing which generally has a horizontally long plate-like rectangular shape. This housing is small enough to be held by a user. A display section 21 (e.g., an LCD) is provided near the center of the front surface of the housing. A touch panel 22 is provided on the screen of the display section. Further, the third controller 20 includes, as other operation means, two analog sticks 23A and 23B, and a plurality of operation buttons 24A to 24J. The analog stick 23A is provided to the left of the display section 21, and the analog stick 23B is provided to the right of the display section 21. The operation button 24A (cross key) is provided to the left of the display section 21 and beneath the analog stick 23A, and the operation buttons 24B to 24E are provided to the right of the display section 21 and beneath the analog stick 23B. The operation buttons 24F and 24H are provided beneath the operation buttons 24B to 24E. The operation button 24G is provided beneath the display section 21, the operation button 24I is provided on the left end of the upper side surface of the housing, and the operation button 24J is provided on the right end of the upper side surface of the housing.

A control section such as a microcomputer is provided inside the third controller 20. The microcomputer detects inputs to the touch panel, the analog stick, and the operation buttons, generates operation data indicating the contents of the inputs, and transmits the operation data to the game apparatus 3. Further, the microcomputer receives video data transmitted from the game apparatus 3, and displays a predetermined video on the display section, based on the video data.

Since the content of control performed by the third controller 20 and data used for the control are not directly related to the present embodiment, detailed description thereof is omitted.

Figure 12:
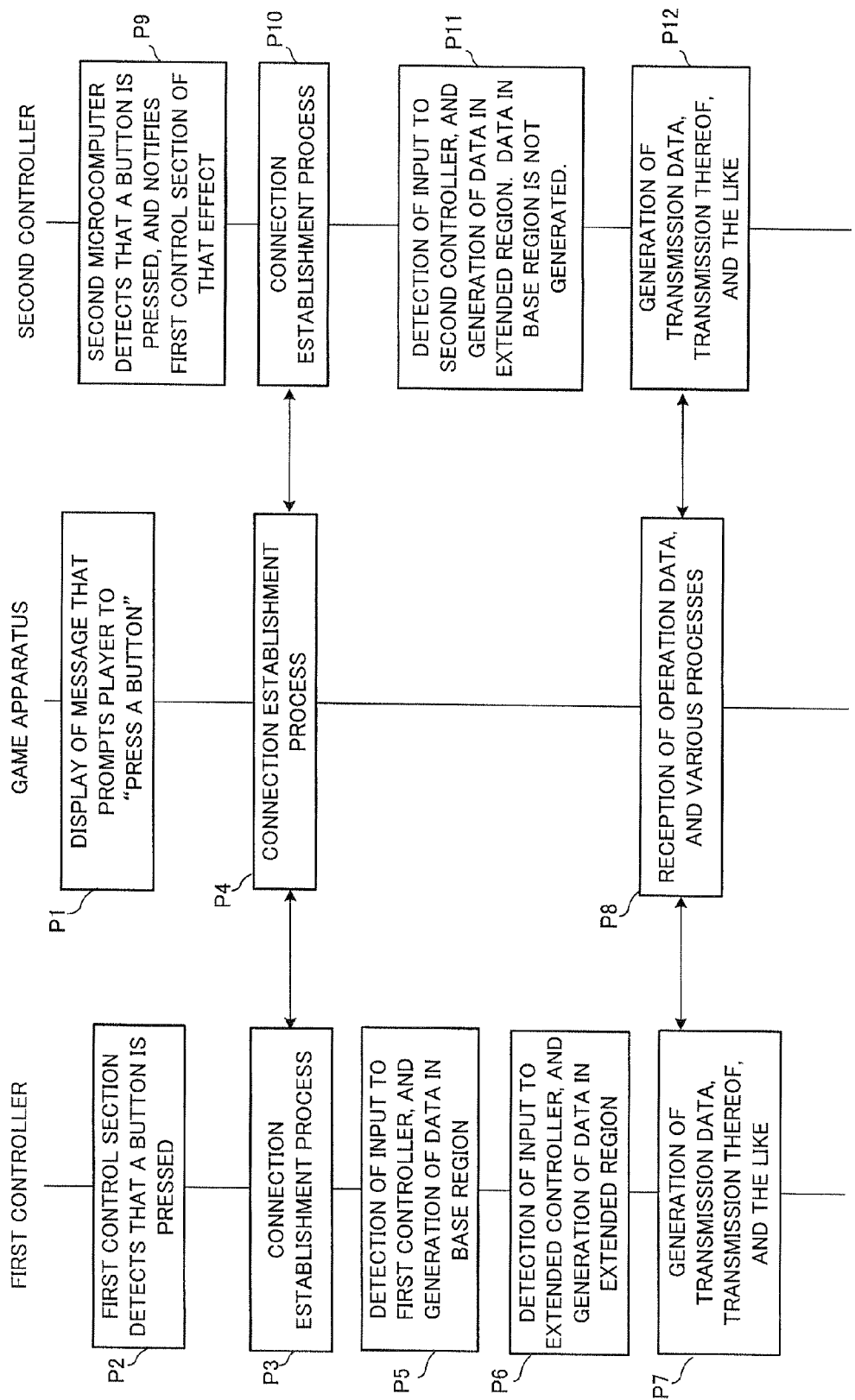
FIG. 12 is a diagram illustrating a flow of processes performed between the first controller 5, the second controller 10, and a game apparatus 3.

Hereinafter, an example of a flow of a controller recognizing process performed between the first controller 5 (the second controller 10) and the game apparatus 3, and an example of a flow of an operation data transmitting/receiving process performed after the recognition process, will be described with reference to FIG. 12. It is assumed that, in advance of processes described below, a so-called pairing process (a process of identifying the connection destination) between each controller and the game apparatus 3 has already been done.

Firstly, processes performed between the first controller 5 and the game apparatus 3 will be described. With reference to FIG. 12, firstly, a process of connecting the first controller 5 (the extended controller 6 may not be connected) to the game apparatus 3 is performed. In the present embodiment, after the game apparatus 3 is activated, the A button (operation button 52d) of the first controller 5 is pressed, and thereby the first controller 5 is connected to (recognized by) the game apparatus 3 (a predetermined controller type is assigned to the first controller 5). Thus, the first controller 5 becomes usable.

Specifically, in the game apparatus 3, a process of displaying, on the television 2, a message that prompts the player to "press the A button of the controller" is executed (P1). In another embodiment, such a message may not be displayed.

When the player presses the A button of the first controller 5, the first control section 56 detects that the A button is pressed. Then, the first control section 56 starts a connection process described below. The A button is an example, and another button may be pressed.

Next, a connection process of establishing wireless connection between the first control 5 and the game apparatus 3 is performed between the first control section 56 and the game apparatus 3 (P3, P4). For example, wireless connection between the first controller 5 and the game apparatus 3 is established by executing a predetermined process based on the protocol of Bluetooth (registered trademark). This process may include a process of determining a controller type to be assigned to the controller connected to the game apparatus, and lighting any of the LEDs 54a to 54d in accordance with the determined controller type.

After the wireless connection between the first controller 5 and the game apparatus 3 has been established, transmission of transmission data (operation data) and a process based on the transmission data are appropriately executed between the first control section 56 and the game apparatus 3. Specifically, in accordance with an operation performed on the first controller 5 by the player, the first control section 56 generates data indicating the content of the operation in the base region 302 (P5). If the extended controller 6 is connected to the first controller 5 and the extended controller 6 is being operated, the second control section 66 generates the content of the extended data 308, and outputs the extended data 308 to the first control section 56 via the microcomputer 59 (P6). The first control section 56 includes, in the transmission data 300, the extended data 308 outputted from the second control section 66 via the microcomputer 59, and transmits the transmission data 300 to the game apparatus 3 (in this case, the format described with reference to FIG. 6 and the report ID 305 corresponding to the format are used) (P7). Further, the first control section 56 receives various kinds of data transmitted from the game apparatus 3, and appropriately controls the first controller 5 (e.g., vibration control or audio output). The game apparatus 3 performs a predetermined process based on the data transmitted from the first controller 5, and transmits, according to need, data for controlling the first controller 5 to the first control section 56 (P8). Thereafter, the process steps P5 to P8 are appropriately repeated.

Next, processes to be performed between the second controller 10 and the game apparatus 3 will be described. In the present embodiment, after the game apparatus 3 is activated, the A button (operation button 122A) of the second controller 10 is pressed, and thereby the controller 10 is connected to the game apparatus 3. Thus, the controller 10 becomes usable.

When the player presses the A button of the second controller 10, the microcomputer 203 detects that the A button is pressed, and notifies the first control section 201 of this effect (P9). The A button is an example, and another button included in the first digital button section 204 may be pressed.

Upon receiving the notification that the A button has been pressed, the first control section 201 starts a connection process for establishing wireless connection between the first controller 5 and the game apparatus 3 (P4, P10). This process is similar to the connection process performed between the first controller 5 and the game apparatus 3.

After the wireless connection between the second controller 10 and the game apparatus 3 has been established, transmission of operation data and a process based on the operation data are appropriately executed between the first control section 201 (the second controller 10) and the game apparatus 3. At this time, the content of control performed by the first control section 201 is as follows. That is, detection of input to the first digital button section 204 by the microcomputer 203 and output of the detected content to the first control section 201 are performed, but the first control section 201 performs control such that data indicating the result of the detection performed on the first digital button section 204 is not included in the base region 302. On the other hand, the second control section 202 detects the contents of inputs to the first digital button section 204, the second digital button section 205, and the analog stick section 206. Based on the detection result, the second control section 202 generates extended data 308, and outputs the extended data 308 to the first control section 202 (P11). The first control section 201 stores the extended data 308 in the extended region 303, and sets a predetermined report ID 305 with the base region 302 being filled with null data, thereby generating transmission data 300. Then, the first control section 201 transmits the transmission data 300 to the game apparatus 3. The game apparatus 3 performs a predetermined process based on the data transmitted from the second controller 10, and transmits, according to need, data for controlling the second controller 10 to the first control section 202 (P8, P12). Thereafter, the process steps P11 to P12 are appropriately repeated.

That is, as for the content of the transmission data 300 transmitted from the second controller 10, the base region 302 is filled with null data, and therefore, the transmission data 300 substantially consists of the header region 301 and the extended region 303. That is, the data indicating the content of operation performed on the second controller 10 is transmitted to the game apparatus 3 substantially by using only the extended region 303. As described above, the base region 302 itself is secured although its content is null data, and the base region 302 is included in the transmission data 300. Therefore, the same data format as that used when the first controller 5 transmits the transmission data to the game apparatus 3 can be used as the format of the transmission data in the second controller 10. In other words, the developer of game software is allowed to perform development without being conscious of distinction between the first controller 5 and the second controller 10.

As described above, by configuring the second controller 10 so as to have the shape and button arrangement described with reference to FIGS. 7A to 7F, it is possible to provide a controller whose operability is improved as compared with that of the extended controller 6. That is, the two analog sticks are positioned in the upper right portion and the upper left portion of the housing 102, respectively, when the housing 102 is viewed from the front thereof, such that the player is allowed to operate the sticks with left and right thumbs when holding the grips 103L and 103R, respectively. Therefore, it is possible to secure a sufficient interval between the two sticks in the horizontal direction, thereby improving the operability of each analog stick.

Further, the cross key 121 and the first operation button set are positioned inside relative to the two analog sticks. Therefore, as compared to a controller in which a cross key (whose key top is lower than analog sticks) is positioned outside relative to the analog sticks (which are higher than the cross key), it is possible to avoid such a situation that the analog sticks that are higher than the cross key impede the player from operating the cross key. Thus, the operability is improved. The same can be said for the second operation button set. That is, since the second operation button set is positioned inside relative to the two analog sticks, the height of the analog sticks does not interfere with the player's fingers, which allows the player to easily operate these buttons.

Further, since the cross key 121 and the first operation button set are positioned with a certain interval between them, even if the left and right thumbs are put on the cross key 121 and the first operation button set, respectively, the thumbs are prevented from touching and interfering with each other, and thus the cross key 121 and the first operation button set are improved in operability. Further, as for movement of the left thumb between the left stick 111 and the cross key 121 and movement of the right thumb between the right stick 112 and the first operation button set, the player can move each thumb easily and naturally with the base of the thumb as a fulcrum point. Therefore, the player can easily operate them.

Further, since the parts of the analog sticks, each having a certain volume in the depth direction because of its configuration when provided on the housing 102, are located in the upper right position and the upper left position of the housing 102, respectively, it is possible to reduce the thickness of the battery storage area of the housing 102 (the area corresponding to the battery cover 135 when viewed from the back surface of the housing 102). As a result, when the player holds the grips 103L and 103R with both hands, there is no obstacle to fingers put on the back surface, which allows the player to easily hold the grips 103L and 103R. In addition, the weight balance of the entire controller is appropriately adjusted in view of ease for holding, which contributes to improvement of operability.

Further, the above-described arrangement of the two analog sticks causes the left stick 111 and the L button 125L to be positioned close to each other, and causes the right stick 112 and the R button 125R to be positioned close to each other. As a result, it is possible to improve the operability of operation of the L button 125L and the R button 125R by using left and right index fingers with thumbs being put on the analog sticks. For example, it is possible to improve the operability in a case where either of the analog sticks and either of the L and R buttons 125L and 125R are operated simultaneously.

Further, as described above, the left stick 111 and the right stick 112 also serve as push buttons. Since the two analog sticks are positioned such that, when the player holds the grips 103, thumbs of his/her both hands naturally touch the sticks, the player is allowed to push the analog sticks with the hands and fingers holding the grips 103 being in their natural positions, and moreover, the player is allowed to easily tilt the analog sticks in the natural positions.

Further, in the present embodiment, as described above, when transmitting the operation content from the second controller 10 to the game apparatus 3, the same format as any of the plurality of formats of the transmission data used by the first controller 5 (more precisely, any of the formats using the extended region 303) can be used. Therefore, the software asset used in the subordinate model can be utilized in the game apparatus 3 as the superordinate model. For example, when developing a game using the second controller 10, the development knowhow of the subordinate model and the processes (library, module, and the like) used in the development of the subordinate model can be utilized in the processes in the game apparatus 3, thereby reducing the burden on the game development and the like.

Further, in the present embodiment, the hardware configuration of the first control section 201 of the second controller 10 is substantially identical to that of the first control section 56 of the first controller 5, and the content of control (function) performed by the first control section 201 of the second controller 10 is nearly identical to that performed by the first control section 56 of the first controller 5. That is, the first control section 56 of the first controller 5 can be used (in terms of hardware and software) as the first control section 201 of the second controller 10. Thereby, the cost for manufacturing the second controller 10 can be reduced. Further, since the second control section 66 of the extended controller 6 can be used as the second control section 202, reduction in the manufacturing cost is similarly achieved.

(Modification)

In the above-described embodiment, as for the content of control performed by the first control section 201 of the second controller 10, the content of operation performed on the first digital button section 204 is not included in the base region 302 (data in the base region 302 is not generated). Alternatively, for example, the result of detection performed on some buttons, specifically the system operation buttons 123A to 123C, may be stored in the base region 302. These buttons are used for stopping the game process to return to the home screen, rather than for direct game operation. Therefore, when input operations performed on these buttons are included also in the base region 302 and transmitted, operation directly controlled by the system of the game apparatus 3 can be detected reliably, for example, recovery operation or the like can be executed securely.

INDUSTRIAL APPLICABILITY

The game system and the game controller according to the present embodiment can improve operability, utilize software asset of a subordinate model, and achieve reduction in the hardware cost, and therefore, are useful as game controllers or the like of various kinds of game apparatuses and personal computers.

DESCRIPTION OF THE REFERENCE CHARACTERS 1 game system
2 monitor
2a speaker
3 game apparatus
5 first controller
6 extended controller
8 marker section
10 second controller
20 third controller
21 display section
22 touch panel
23 analog stick
24 operation button
51 housing
52 operation section
53 connector
54 LED
55 image pickup element
61 analog stick
63 operation button
64 connection cable
65 connector
66 grip section
101 controller
102 housing
103L grip (left)
103R grip (right)
111 left stick
112 right stick
121 cross key
122A operation button
122B operation button
122C operation button
122D operation button
123A minus button
123B home button
123C plus button
125L L button
125R R button
126L ZL button
126R ZR button
128 power operation button
131A LED
131B LED
131C LED
131D LED
132 charging indicator
133 charging connector
135 battery cover
136 connect button
137 reset button

The invention claimed is:

1. A game system including at least a first game apparatus, a first game controller, and a second game controller, wherein
the first game controller comprises:
a first communication section that wirelessly communicates with the game apparatus;
a first detection section that is able to generate first transmission data including a result of an input performed on a predetermined operation section;
a first operation section that includes a plurality of keys, and is electrically connect ed to the first detection section; and
a connector to which an extended controller is detachably connected, the extended controller including a second operation section that includes a plurality of keys, and a second detection section that is able to output, to the first detection section, second operation section detection data indicating the content of an input to the second operation section, wherein
the first detection section detects at least an input to the first operation section, generates the first transmission data in which first operation section detection data indicating the result of the detection is included, and outputs the first transmission data to the first communication section, and
the first communication section transmits, to the game apparatus, the first transmission data outputted from the first detection section, and
the second game controller comprises:
a second communication section that communicates with the game apparatus by using the same wireless protocol as that used by the first communication section;
a third detection section that is able to generate second transmission data including a result of an input performed on a predetermined operation section;
a fourth detection section; and a third operation section that includes a plurality of keys, and is electrically connected to the third detection section and the fourth detection section, wherein the third detection section and the fourth detection section are able to detect an input to the third operation section, the fourth detection section outputs, to the third detection section, third operation section detection data detected by the fourth detection section, the third detection section generates the second transmission data in which third operation section detection data detected by the third detection section is not included but the third operation section detection data outputted from the fourth detection section is included, and outputs the second transmission data to the second communication section, and the second communication section transmits, to the game apparatus, the second transmission data outputted from the third detection section.

2. The game system according to claim 1, wherein the number of keys included in the third operation section is greater than the number of keys included in each of the first operation section and the second operation section.

3. The game system according to claim 1, wherein
the second game controller includes a housing having grips held by left and right hands of a player, and
the third operation section comprises:
a first stick that is provided at an upper left position in a front surface of the housing of the second game controller, which position allows the player to operate the first stick with a thumb of his/her left hand when the player holds the grips;
a second stick that is provided at an upper right position in the front surface of the housing of the second game controller, which position allows the player to operate the second stick with a thumb of his/her right hand when the player holds the grips;
a direction key that is provided at a position close to the center of the housing relative to the first stick on the front surface of the housing, which position allows the player to operate the direction key with the thumb of the left hand when the player holds the grips;
a plurality of first type operation buttons that are provided at a position close to the center of the housing relative to the second stick on the front surface of the housing, which position allows the player to operate the first type operation buttons with the thumb of the right hand when the player holds the grips;

one or more second type operation button(s) that is provided at a position close to the center of the housing relative to the first stick and the second stick on the front surface of the housing, and above the direction key and the plurality of first type operation buttons;

a third type operation button that is provided at a position beneath the second type operation button(s) on the front surface of the housing, and between the direction key and the plurality of first type operation buttons; and a plurality of fourth type operation buttons provided at positions in the vicinity of left and right ends of an upper surface of the housing of the second game controller, respectively, which positions allow the player to operate the fourth type operation buttons with his/her left and right index fingers, respectively, when the player holds the grips.

4. A game controller used for a predetermined game apparatus, comprising:
a communication section that wirelessly communicates with the predetermined game apparatus;
a first detection section that is able to generate transmission data including a result of an input performed on a predetermined operation section;
a second detection section; and
an operation section that includes a plurality of keys, and is electrically connected to the first detection section and the second detection section, wherein
the first detection section and the second detection section are able to detect an input to the operation section,
the second detection section outputs detection data detected by the second detection section to the first detection section,
the first detection section generates the transmission data in which detection data detected by the first detection section is not included but the detection data outputted from the second detection section is included, and outputs the transmission data to the communication section, and
the communication section transmits, to the game apparatus, the transmission data outputted from the first detection section.

* * * * *